No. 845,629. PATENTED FEB. 26, 1907.
J. GAYNOR.
BURGLAR ALARM.
APPLICATION FILED AUG. 25, 1906.
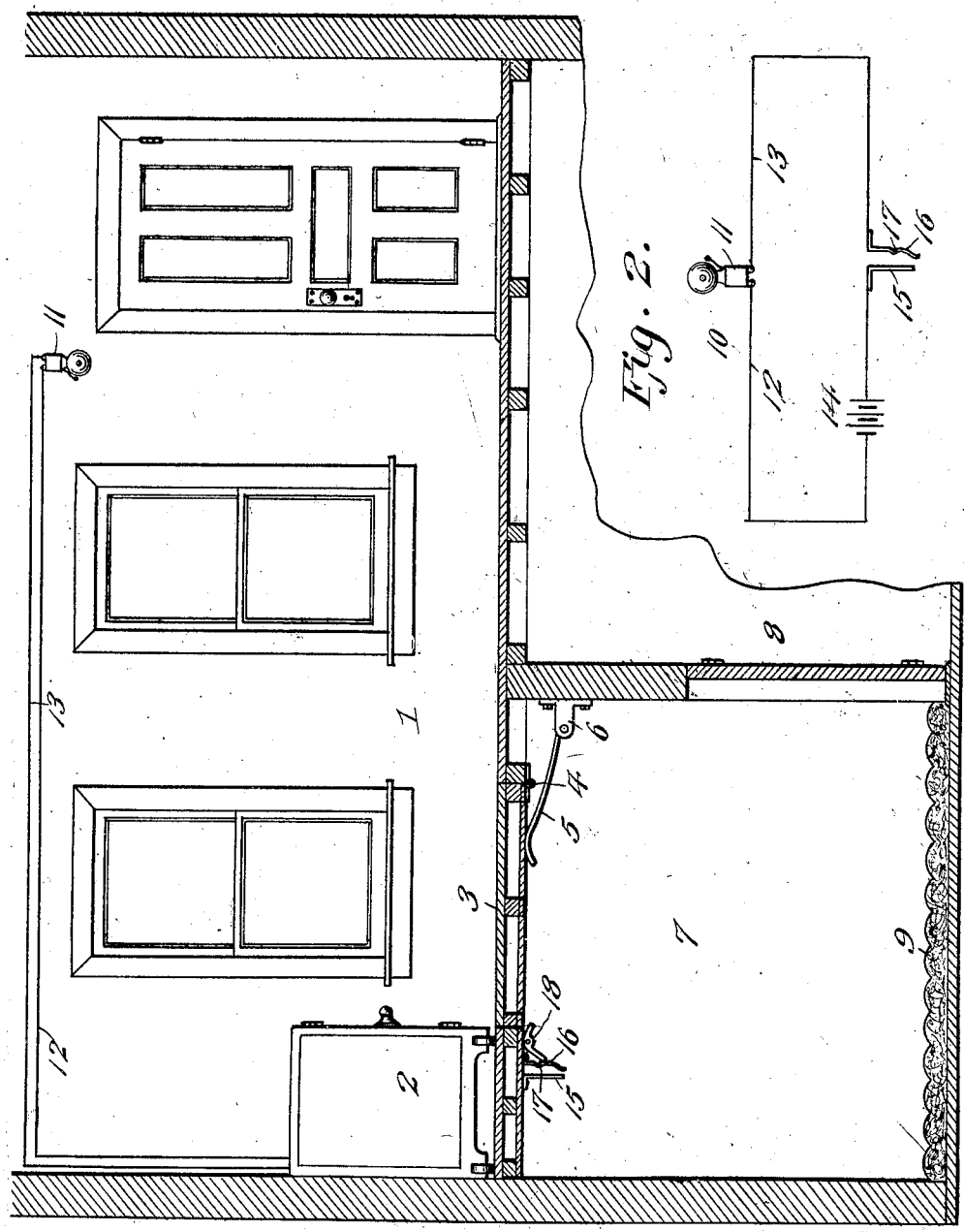
Witnesses
Frank B. Hoffman
Elizabeth Fague
Inventor
Joseph Gaynor
By Victor J. Evans
Attorney

UNITED STATES PATENT OFFICE.

JOSEPH GAYNOR, OF BARRE, VERMONT.

BURGLAR-ALARM.

No. 845,629. Specification of Letters Patent. Patented Feb. 26, 1907.

Application filed August 25, 1906. Serial No. 332,042.

*To all whom it may concern:*

Be it known that I, JOSEPH GAYNOR, a citizen of the United States, residing at Barre, in the county of Washington and State of Vermont, have invented new and useful Improvements in Burglar-Alarms, of which the following is a specification.

The invention relates to an improvement in burglar-alarms of the type wherein a trap is arranged at a determinate point in the floor of a room and designed to be operated by the weight of an intruder, an automatic alarm being continuously sounded after the initial operation of the trap.

The invention will be described in the following specification, reference being had particularly to the accompanying drawings, in which—

Figure 1 is a sectional view illustrating the application of my invention. Fig. 2 is a diagrammatic view illustrating the wiring of the alarm proper.

Referring to the drawings, 1 represents a compartment in which is located a safe 2 or other particular article which it is desired to protect. A trap 3 is formed in the floor proper adjacent the safe, being of a size to prevent access to the safe except when on the trap. The trap is preferably a section of the floor and has hinged connection therewith, as at 4, being disposed to move downward under the influence of a weight on the trap. A spring 5, supported in brackets 6, secured to the studding beneath the particular compartment, is designed to normally support the trap in elevated or closed position. Provision is made for receiving the intruder precipitated from the trap-opening by arranging a closed compartment 7 beneath the trap, which latter compartment may be provided with a door 8 to afford access to authorized individuals, and may, if preferred, be provided with a padded floor 9 to prevent excessive injury to the party caught in the trap.

In connection with the trap I arrange an automatic alarm comprising a signaling device 10, which may be disposed at any desired point either in the building in which the trap is arranged or at a distance therefrom, as desirable. Conductors 12 and 13 lead from the signal and through a source of energy 14, terminating, respectively, in contact-strips 15 and 16. These respective strips are supported by the floor of the compartment 1 immediately adjacent the relatively free edge of the trap 3. The strips 15 and 16 are normally spaced and form the only break in the alarm-circuit. The strip 16 is formed intermediate its ends with a depression 17, preferably by bending the strip into the angular shape illustrated, the free end of the strip being also bent toward the strip 15 to provide for more effective contact in operation. A trigger 18 is pivotally supported on the under side of the floor of the compartment 1 immediately adjacent the trap-opening. The trigger is of approximately right-angular shape and so pivoted that the free end of one arm projects beyond the edge of the trap-opening in the path of the descending trap. The remaining arm of the trigger rests against the contact-strip 16 below the angular depression 17 therein.

In operation the downward movement of the trap under the influence of the weight of the person thereon will engage and depress the approximate arm of the trigger, thereby forcing the remaining arm into the depression 17 in the strip 16. This movement of the trigger forces the strip 16 into contact with the strip 15, closing the alarm-circuit and sounding the signal. The angular depression 17 serves to maintain the trigger in operative position, thereby insuring the continual contact of the strips 15 and 16 until manually disengaged. The alarm is therefore sounded continuously until after the initial operation of the trap entirely independent of the position of the trap.

It is to be understood that the trap is to be provided with some manually-operable securing means, as a bolt or the like, by which the trap may be prevented from operation under the weight of a person during any desired intervals.

Having thus described the invention, what is claimed as new is—

A burglar-alarm including a trap arranged in the floor of a compartment, a normally open alarm-circuit, spaced contact-strips forming the terminals of said circuit and supported adjacent the platform, one of said strips being formed with an annular depression, and a trigger supported by the floor of the compartment and arranged to be operated in the initial movement of the trap, said trigger forcing the contact-strips into engagement and riding into the said depression, whereby to maintain the strips in contact independent of the position of the trap.

In testimony whereof I affix my signature in presence of two witnesses.

JOSEPH GAYNOR.

Witnesses:
ANNICE McGUE,
JAMES MACKAY.